UNITED STATES PATENT OFFICE.

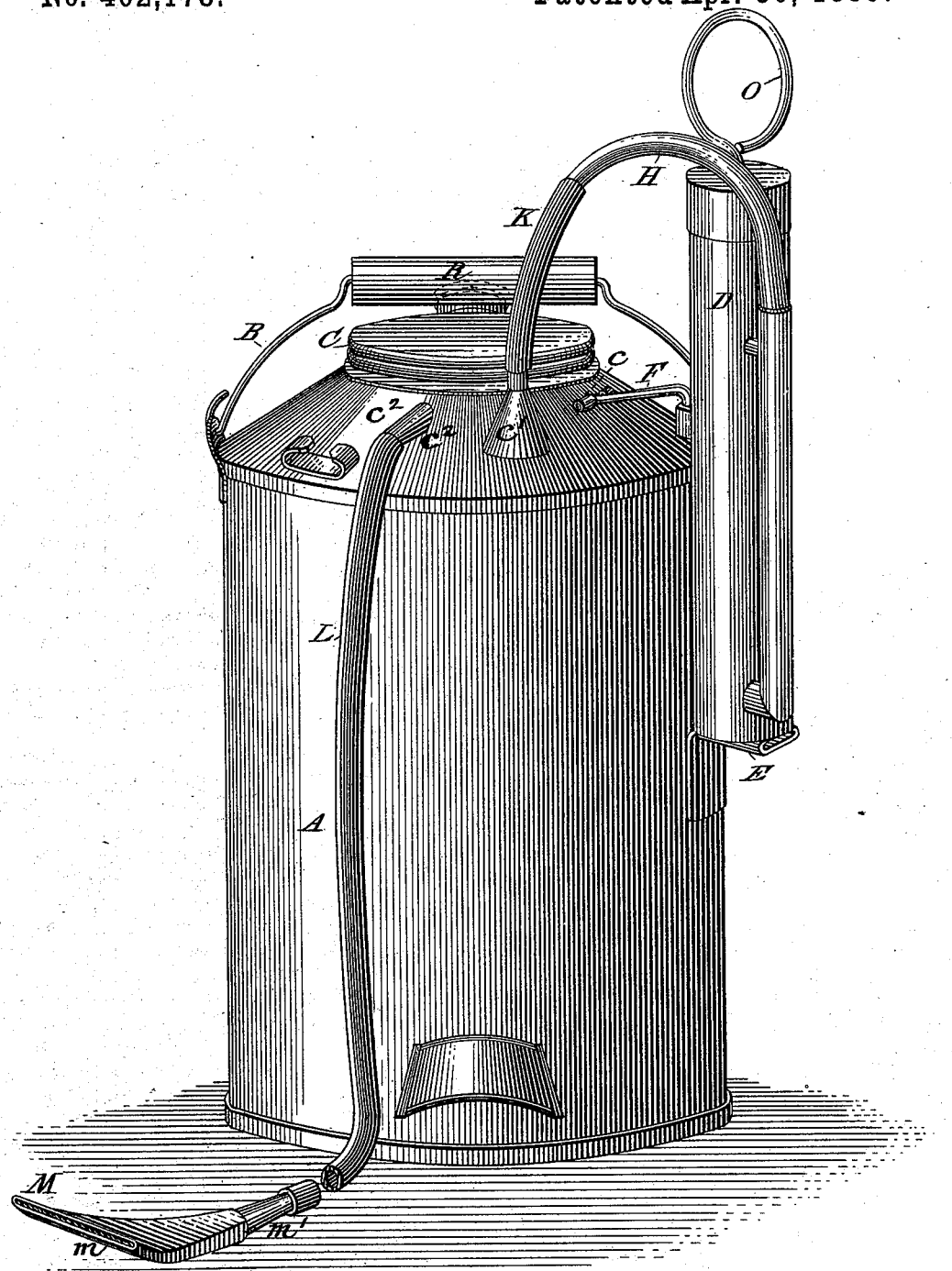

ALMERON MILLER, OF MEADVILLE, PENNSYLVANIA.

DEVICE FOR SKIMMING MILK.

SPECIFICATION forming part of Letters Patent No. 402,178, dated April 30, 1889.

Application filed July 12, 1888. Serial No. 279,735. (Model.)

*To all whom it may concern:*

Be it known that I, ALMERON MILLER, a citizen of the United States, residing at Meadville city, in the county of Crawford, State of Pennsylvania, have invented a new and useful Device for Skimming Cream, of which the following is a specification.

My invention relates to improvements in dairy devices by which milk can be skimmed rapidly and clean without danger of mixing the cream with the milk.

The drawing is an elevation in perspective of my improved skimming device.

A represents a pail with a cover at C, which may be easily removed, and by packing and a screw or clamp placed in position in such a manner as to be air-tight in the joint.

D is an air-pump with a handle at O, and connected with the pail A by a bent tube, H, and a flexible hose, K. This pump is attached to the pail by a foot-clamp, E, and a hook, F, or any other device by which it may be easily removed from the pail or attached thereto.

B is a bail attached to the pail in the usual manner.

M is a skimmer with a long narrow mouth or opening, m, for the cream to enter. This skimmer is attached to the pail A by a flexible tube or hose, L L. The end of the skimmer is bent or curved slightly, as shown in the drawing, so that when it is placed on the surface of the cream it will be parallel with the surface of the cream, while the tapering tubular shank m, attached to the hose, will not come in contact therewith. This permits it to be moved by the hand of the operator along the surface of the cream. The body of the skimmer decreases in width from the mouth m to the shank m', so that the cream will pass freely out of the skimmer.

R is a spout by which the pail may be emptied. This spout has a cork or an airtight screw-plug.

The operation of my device is as follows, to wit: The pail A is placed near the vessel containing the milk to be skimmed. The air-pump D is operated with one hand and the skimmer moved over the surface of the milk with the other. This draws or sucks the cream into the pail rapidly and with care in the use of the skimmer, leaving the milk undisturbed.

What I claim as my invention, and desire to secure by Letters Patent, is—

The described device for skimming cream from milk, consisting of a pail provided with an air-tight cover, an air-pump, a tube connecting the pail and pump, and a flexible tube connected to said pail and carrying at its outer end a curved skimmer with a long narrow mouth, all constructed and operating substantially as set forth.

ALMERON MILLER.

Witnesses:
   A. B. RICHMOND,
   G. S. WYCKOFF.